(12) United States Patent
Roseborrough (10) Patent No.: US 11,772,738 B2
(45) Date of Patent: Oct. 3, 2023

(54) REAR WHEEL LINKAGE SYSTEM FOR A CHAIN-WHEELED VEHICLE

(71) Applicant: Michael Joe Roseborrough, Las Cruces, NM (US)

(72) Inventor: Michael Joe Roseborrough, Las Cruces, NM (US)

(*) Notice: Subject to any disclaimer, the term of this patent is extended or adjusted under 35 U.S.C. 154(b) by 220 days.

(21) Appl. No.: 17/380,133

(22) Filed: Jul. 20, 2021

(65) Prior Publication Data
US 2022/0185424 A1    Jun. 16, 2022

Related U.S. Application Data

(60) Provisional application No. 63/124,740, filed on Dec. 12, 2020.

(51) Int. Cl.
*B62K 25/26* (2006.01)
*B62M 9/00* (2006.01)

(52) U.S. Cl.
CPC .............. *B62K 25/26* (2013.01); *B62M 9/00* (2013.01)

(58) Field of Classification Search
CPC .............................. B62K 25/28; B62K 25/283
See application file for complete search history.

(56) References Cited

U.S. PATENT DOCUMENTS

| 6,450,520 | B1 * | 9/2002 | Girard | B62K 25/286 |
| | | | | 280/275 |
| 9,039,026 | B2 * | 5/2015 | Hudec | B62K 25/28 |
| | | | | 280/283 |
| 10,011,318 | B2 * | 7/2018 | Beale | B62K 25/286 |
| 11,173,983 | B2 * | 11/2021 | Zawistowski | B62K 25/286 |
| 2023/0063529 | A1 * | 3/2023 | Canfield | B62K 19/34 |

FOREIGN PATENT DOCUMENTS

JP       2015112947 A  *  6/2015

* cited by examiner

*Primary Examiner* — Kevin Hurley
(74) *Attorney, Agent, or Firm* — Michael D. Eisenberg (57) ABSTRACT

A rear wheel linkage system for connecting a rear wheel of a chain wheeled vehicle to a frame of the chained wheel vehicle, the chained wheeled vehicle having a front side, a rear side, and lateral sides, and comprises a pair of upper links, a pair of lower links, and a coupler link. The upper links are configured to be hingedly joined to first locations of the frame, at a rear of the frame above or near a top of the rear wheel. The lower links are configured to be hingedly joined to second locations of the frame, ahead of the rear wheel. The coupler link is configured to be hingedly joined to both sides of an axle of the rear wheel, the coupler link has an upper side, a lower side, and a front side and to be hingedly joined to upper links, the lower links, and the frame.

7 Claims, 8 Drawing Sheets

Fig. 1
(General Art)

Fig. 2
(General Art)

Fig. 7a (General Art)

Fig. 7b

Fig. 8a (General Art)

Fig. 8b

REAR WHEEL LINKAGE SYSTEM FOR A CHAIN-WHEELED VEHICLE

CROSS-REFERENCES TO RELATED APPLICATIONS

This application claims priority from U.S. Provisional Application Ser. No. 63/124,740 filed Dec. 12, 2020, which is hereby incorporated herein by reference in the respective in its entirety.

TECHNICAL FIELD

The present invention relates to chain-wheeled vehicles, particularly motorcycles, and more specifically to rear wheel linkage systems linking the rear wheel to the frame in for such vehicles.

BACKGROUND

Figure 1:
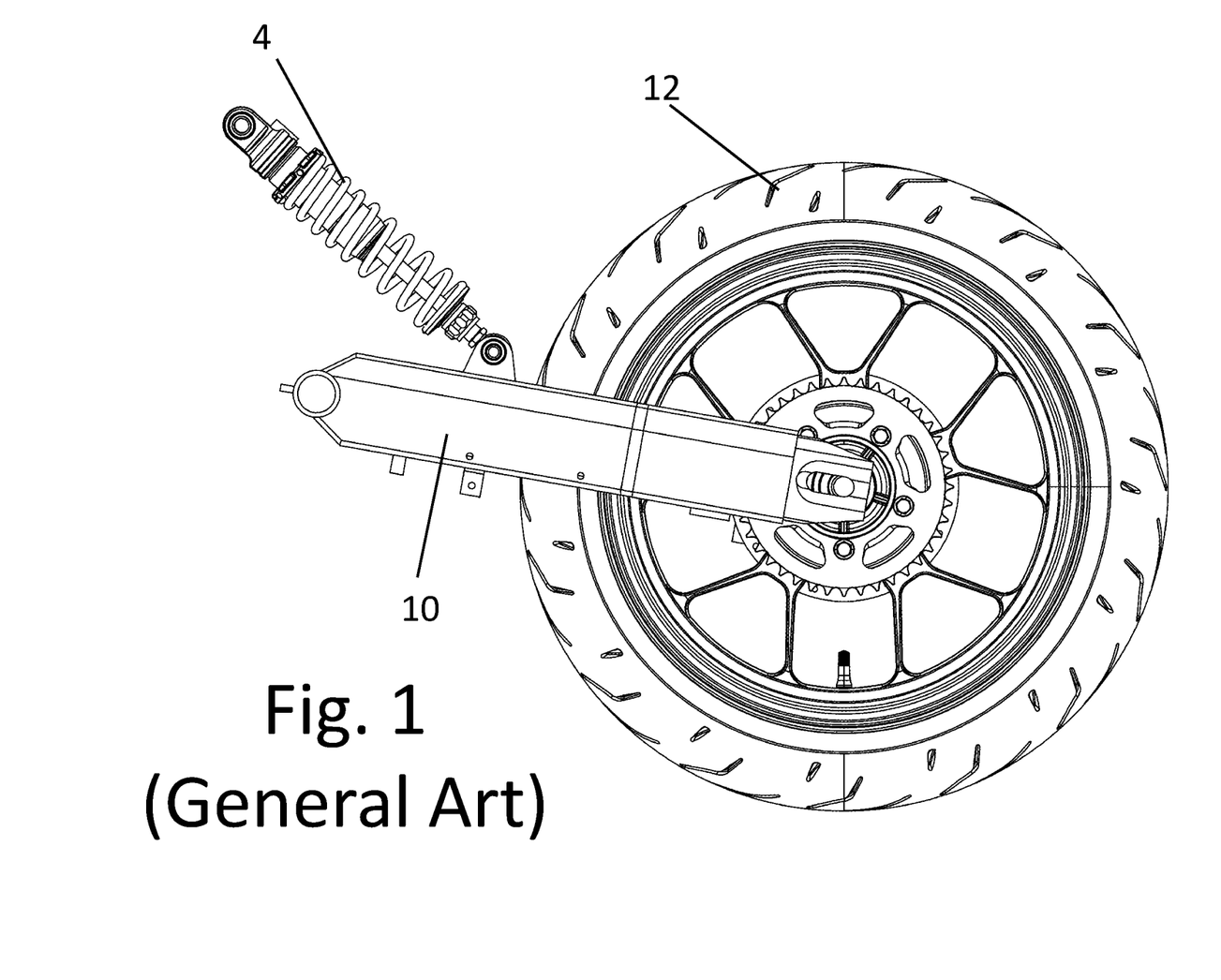
FIG. 1 illustrates a traditional swing arm attachment, as known in the general art.

The evolution of motorcycle suspension has had only three basic stages; 1) the rigid motorized bicycle, 2) the use of a spring and damper linking the rigid chassis (frame) to the front wheel, and 3) a swing arm attachment 10, shown in FIG. 1, that links the rear wheel 12 to the frame conjoined with a spring and damper 4. The swing arm was first introduced in 1939 and from that date to the present, the mechanical topology has remained unchanged.

Conventional two-wheeled vehicles, particularly motorcycles, suspension systems, have three primary functions. Those functions are to: (1) provide a level of comfort to the rider (and any passenger), (2) increase vehicle performance, and (3) ensure that the first two functions are provided in the safest possible manner. Increasing the rider comfort can be defined as minimizing the transmission of ground surface irregularities over which the vehicle travels.

Secondly, suspension systems are provided to increase the vehicle's performance, which, is closely related to control. The control of a vehicle during acceleration and braking is a function of the traction of the vehicle's tires and variance of the vehicle's geometry.

During acceleration and deceleration of a conventional swing arm type motorcycle, the frame moves with respect to the rear wheel 12, causing a loss of the control of the motorcycle. During acceleration, a squat occurs, in which the frame is pulled toward the rear wheel. During deceleration, a dive occurs, in which the frame is rotates away from the rear wheel. The larger the acceleration or deceleration, the more substantial the squat or dive is.

Figure 2:
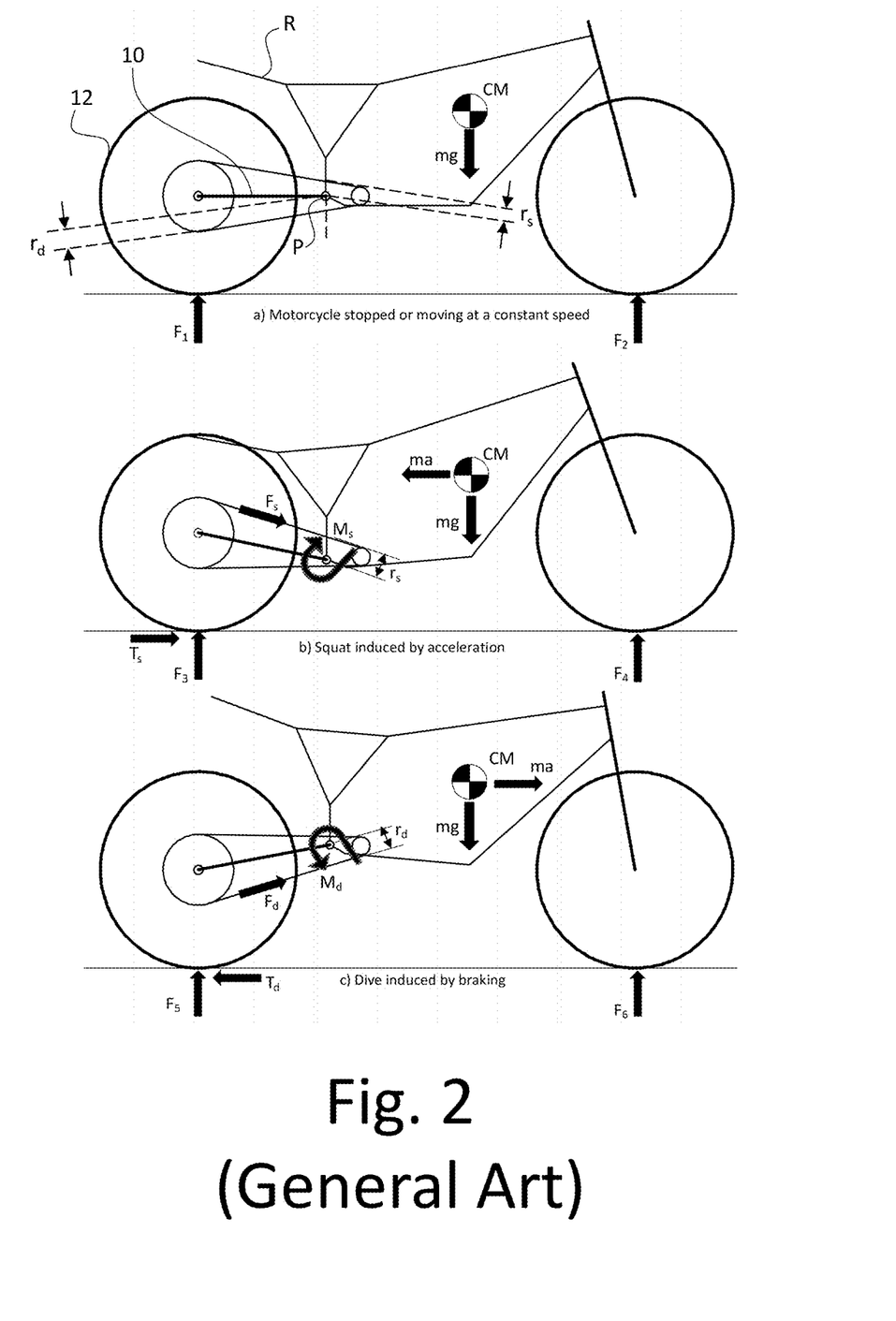
FIGS. 2a-2c illustrate the reaction of a chain-wheeled vehicle with a swing arm attachment known in the general art to constant speed, acceleration, and deceleration.

FIG. 2a shows a conventional swing arm type motorcycle stopped or moving at constant speed. The forces acting on the motorcycle are gravity (mg) at the center of mass (CM), the normal force at the rear wheel ($F_1$), and the normal force at the front wheel ($F_2$).

$$F_1 + F_2 = mg.$$

FIG. 2b shows a conventional swing arm type motorcycle accelerating. As the motorcycle accelerates, a forward-directed traction force $T_s$ acts on the rear wheel. The chain turns clockwise, the chain tension $F_s$ is on the top section of the chain, since the bottom section of the chain sags during acceleration. The chain tension $F_s$ acts on a distance $r_s$ between the top section of the chain and the pivot P via which the swing arm 10 is joined to the frame R to generate a clockwise torque $M_s$. The clockwise torque $M_s$ acts on the swing arm 10 and pulls the rear wheel upward toward the frame R. Since the weight of the rear wheel prevents the rear wheel from rising above the ground toward the frame R, torque $M_s$ causes the frame R to be lowered toward the rear wheel because of the hinging of the swing arm on the rear wheel and on the frame. This transfers the weight of the motorcycle rearward onto the rear wheel. Therefore, $F_3$ (the normal force on the rear wheel during acceleration) is higher than $F_1$. Because mg does not change, $F_4$ (the normal force on the front wheel during acceleration) is lower than $F_2$. Thus, during acceleration, the decrease in the normal force between the ground and the front wheel decreases traction between the ground and the front wheel. This phenomenon is called squat, and decreases the steering control of the motorcycle.

FIG. 2c shows a conventional swing arm type motorcycle decelerating. As the motorcycle decelerates, a rearward-directed traction force $T_d$ acts on the rear wheel. The chain turns counterclockwise, the chain tension $F_d$ is on the bottom section of the chain, since the top section of the chain sags during deceleration. The chain tension $F_d$ acts on a distance $r_d$ between the bottom section of the chain and the pivot P via which the swing arm 10 is joined to the frame R to generate a counterclockwise torque $M_d$. The counterclockwise torque $M_d$ acts on the swing arm 10 and pushes the rear wheel downward, away the frame R. Since resistance from the ground prevents the rear wheel from sinking into the ground, torque $M_s$ causes the frame R to be raised away from the rear wheel, because of the hinging of the swing arm on the rear wheel and on the frame. This transfers the weight of the motorcycle forward onto the front wheel. Therefore, $F_6$ (the normal force on the front wheel during deceleration) rises and becomes higher than $F_2$. Because mg does not change, $F_3$ (the normal force on the rear wheel during deceleration) decreases and becomes lower than $F_1$. Thus, during deceleration, the loss in the normal force between the ground and the rear wheel decreases traction between the ground and the rear wheel. This phenomenon is called dive and can be disconcerting to the rider, who may feel like he or she is about to be thrown over the front of the motorcycle. If the motorcycle dives so far as to bottom out the front forks, it can also cause handling and braking problems.

Safety and performance are directly related in many ways. For example, dramatic changes in the amount of loading on the rear and front wheels during acceleration and braking (squat and dive) result in a less safe vehicle.

Moreover, cornering motorcycles at speed bring about an additional safety concern as the centripetal force causes the suspension to compress with a hinging motion between the frame on conventional motorcycles and decreases the effective ground clearance. When the rear shock absorber is compressed, causing a hinging at the pivot P, which lowers the pivot P and causes the frame to squat, decreasing the distance between the frame and the ground.

BRIEF SUMMARY OF EMBODIMENTS OF THE INVENTION

Therefore, an aspect of some embodiments of the present invention relates to a rear wheel linkage system for connecting a rear wheel of a chain wheeled vehicle to a frame of the chained wheel vehicle, the chained wheeled vehicle having a front side, a rear side, and lateral sides. The rear wheel linkage system comprises a pair of upper links, a pair of lower links, and a coupler link. The upper links are disposed on either side of the rear wheel and are symmetrical to each other with respect to a central vertical plane splitting the chain wheeled vehicle into two lateral halves. The upper links have first upper ends and first lower ends, the first upper ends being configured to be hingedly joined to first locations of the frame, at a rear of the frame above or near a top of the rear wheel. The lower links are disposed on either side of the rear wheel and symmetrical to each other with respect to the central vertical plane. The lower links have second upper ends and second lower ends, the second upper ends being configured to be hingedly joined to second locations of the frame, ahead of the rear wheel. The coupler link is configured to be hingedly joined to both sides of an axle of the rear wheel, the coupler link have an upper side, a lower side, and a front side. The upper side extends diagonally forward and upward from the axle and has a first rear edge at the axle and a first front edge clearing the wheel. The lower side extends below the upper side from the axle toward a front of the chain wheeled vehicle and has a second rear edge at the axle and a second front edge clearing the wheel. The front side extends between the first front edge and the second front edge, to maintain an angle between the upper side and the lower side constant. The first front edge of the upper side of the coupler link is hingedly joined to the first lower ends of the upper links. The second front edge of the lower side of the coupler link is hingedly joined to the second lower ends of the lower link. The front side coupler link is configured to be hingedly joined to a third rear edge of a rear shock absorber which has a third front edge hingedly joined to the frame ahead of the third rear edge. Each upper link extends diagonally forward and downward from the first upper end to the first lower end, and each lower link extends forward an upward from the second lower end the second upper end. An instantaneous center is a point at which extensions of the upper links and of the lower links have a common vertical height. When the vehicle is at constant speed or idle, the instantaneous center is located above a portion of a chain of the vehicle proximal to a sprocket of the vehicle and above the a center of the sprocket of the vehicle.

In a variant, when the vehicle is at constant speed or idle, a perpendicular distance between the instantaneous center and the chain of the vehicle is above and substantially vertically aligned with the center of the sprocket.

In another variant, the rear wheel linkage system comprises the rear shock absorber.

In yet another variant, the upper side of the coupler link comprises a pair of upper bars located symmetrically to each other with respect to the central vertical, each upper bar having a first rear end connected to the axle and a first front end located below the first locations of the frame. The lower side of the coupler link comprises a pair of lower bars located symmetrically to each other with respect to the central vertical plane, each lower bar having a second rear end connected to the axle and a second front end located below the second locations of the frame. The front side of the coupler link comprises a linkage bar rigidly joined to the first front ends and the second front ends.

In a further variant, when the vehicle is at rest with a weight of the vehicle is suspended, a distance between the instantaneous center and a center of the sprocket of the chain wheeled vehicle is at least 1.30 times larger than a pitch diameter of the sprocket.

In yet a further variant, given a predetermined distance between the axle of the rear wheel and a center of a sprocket of the vehicle, when the vehicle is at rest with a weight of the vehicle is suspended, a configuration of the coupler link, lower links, and upper links in the vehicle allows of variation of the predetermined distance that is equal to or smaller than 0.1%

Another aspect of some embodiments of the present invention relates to a chain wheeled vehicle, comprising the rear wheel linkage system described above.

BRIEF DESCRIPTION OF DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 3A:
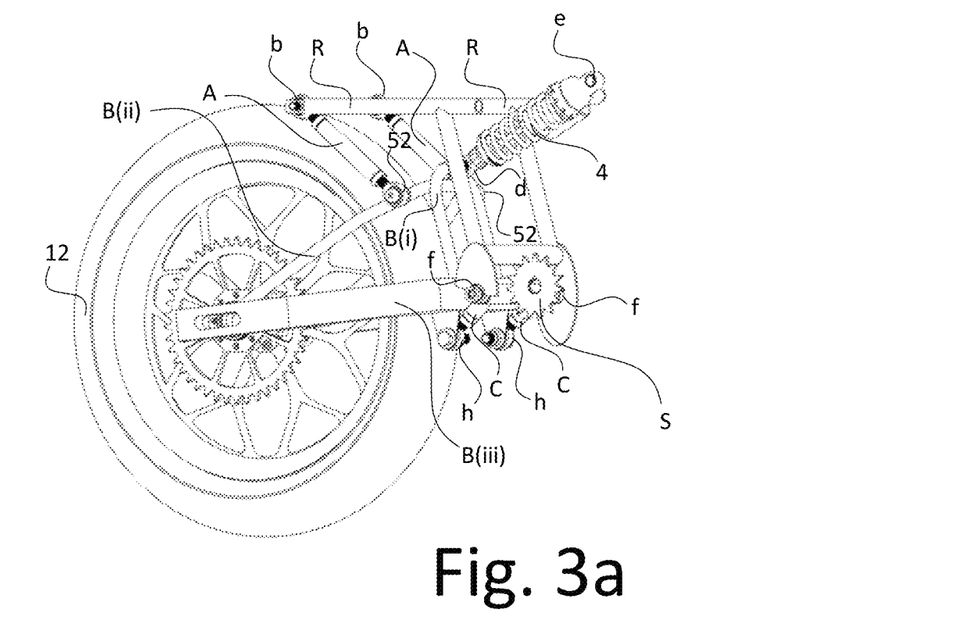
FIG. 3a is a perspective view of a rear wheel of a chained-wheeled vehicle attached to the frame via a linkage suspension system, according to some embodiments of the present invention.
Figure 3B:
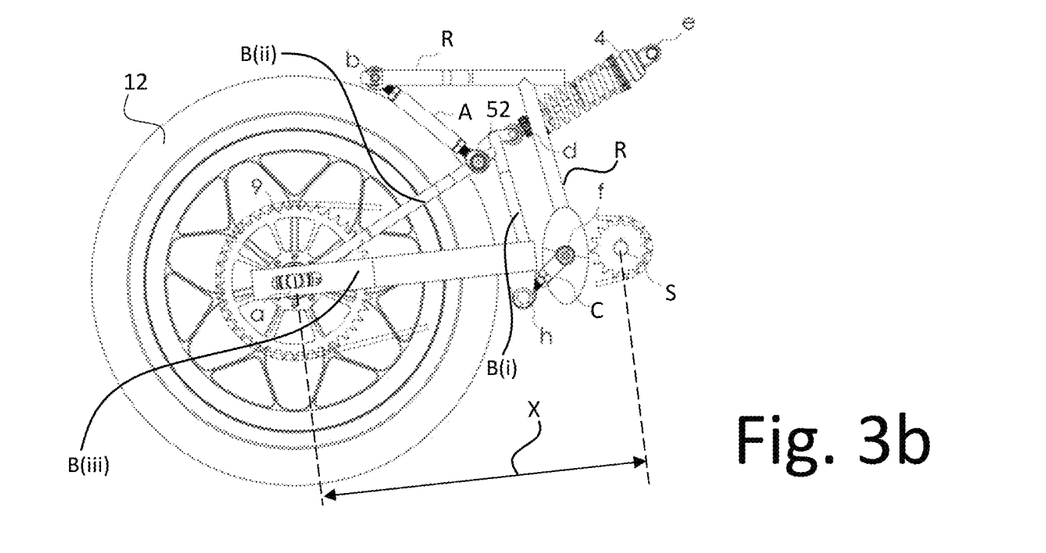
FIG. 3b is a side view of a rear wheel of a two-wheeled vehicle attached to the frame via a linkage suspension system, according to some embodiments of the present invention.
Figure 4:
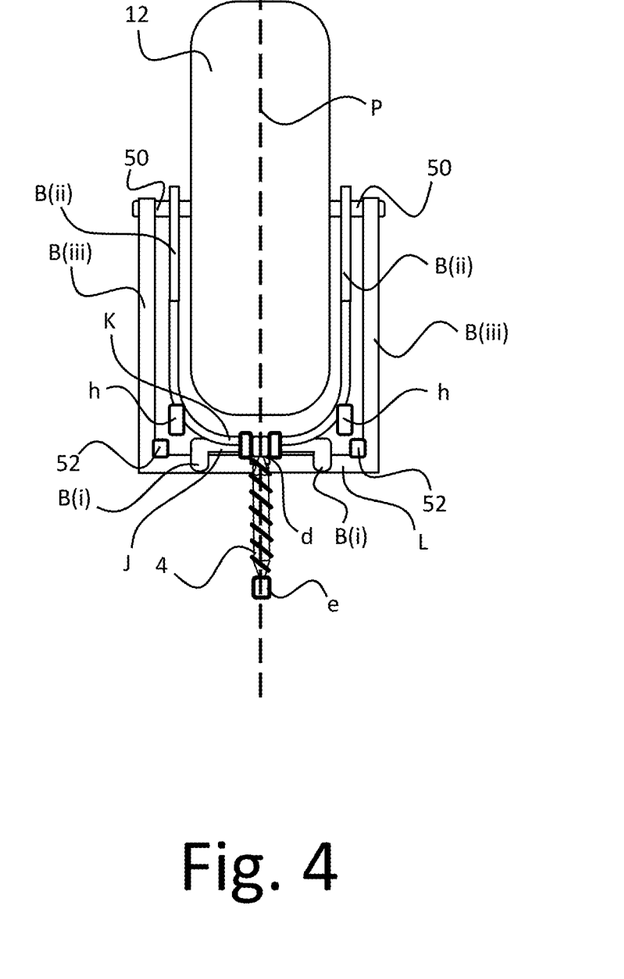
FIG. 4 is a top view of a rear wheel of a two-wheeled vehicle attached to the frame via a linkage suspension system, according to some embodiments of the present invention.

As seen in FIGS. 3a-3b and 4, an aspect of some embodiments of the present invention relates to a rear wheel linkage system for a chain-wheeled vehicle. The rear wheel linkage system is configured to be hingedly joined to the rear wheel 12, to the frame R of the chain wheeled vehicle, and to a rear shock absorber 4 which is also joined to the frame R. The rear wheel linkage system includes a coupler link B, two upper links A, and two lower links C. In some embodiments of the present invention, the rear shock absorber 4 may be part the rear wheel linkage system.

The upper links A are positioned symmetrically to each other with respect to a central vertical plane P traversing the chain wheeled vehicle and splitting the chain wheeled vehicle into two lateral halves. The lower links C are positioned symmetrically to each other with respect to the middle vertical plane P. The upper links A and lower links C may be rod-shaped.

The upper links A are hingedly joined to the frame R at locations b, which are located on the frame R in the vicinity of the top of the rear wheel 12. The lower links C are hingedly joined to the frame R at locations f, which are located on the frame R ahead of the rear wheel 12 so as not to interfere with other components of the vehicle (chain, motor, frame, for example) during the motion of the links C. In some embodiments of the present invention, the upper links A and the lower links C form a four-bar linkage system. As seen in FIGS. 5a-5c, the instantaneous center IC of the vehicle is the point at which the extensions of the upper links A and the extensions of the lower links C have the same vertical height. The instantaneous center IC is the center of rotation of the coupler link B with respect to the frame R.

The coupler link B is hingedly joined to the axle 50 of the rear wheel 12 on both sides of the rear wheel 14. The coupler link B is also disposed to be symmetrical with respect to the central plane P. The coupler link B extends forward from the axle 50 and is hingedly joined to the upper links A at respective locations 52 (symmetrical to each other with respect to the plane P) and hingedly joined to the lower links B at respective locations h (symmetrical to each other with respect to the plane P). Locations 52 are near the top of the coupler link B. Locations h are ahead of the rear wheel 12, near the bottom or at the bottom of coupler link B. The coupler link B is hingedly joined to a rear edge of the rear shock absorber 4 at a location d on the coupler link B. The location d is ahead of the rear wheel 12 in the vicinity of location 52. The rear shock absorber is configured to be joined to the frame R by a second end e of the rear shock absorber 4.

In some embodiments of the present invention, the coupler link B incudes a pair of upper bars B(ii), a pair of lower bars B(iii), and at least one linkage bar B(i). The upper bars B(ii) are symmetrical to each other with respect to the plane P. The upper bars B(ii) have the same orientation and form an upper side of the coupler link extending diagonally upward from the axle of the rear wheel. The lower bars B(iii) are symmetrical to each other with respect to the plane P. The lower bars B(iii) have the same orientation and form a lower side of the coupler link extending from the axle of the rear wheel and being located below the upper side. The linkage bar(s) B(i) extends (extend) between the forward edges of the upper side and the lower side to form a front side of the coupler link. If two or more linkage bars B(i) are present, they are symmetrical to each other with respect to the plane P and have the same orientation.

Each lower bar B(iii) has a rear end joined to the axle 50 and a front end (which clears the rear wheel 12) which has a vertical height lower than the vertical high of location f of the frame R. Each upper bar B(ii) has a rear end joined to the axle 50 and a front end (which clears the rear wheel 12) which has a vertical height lower than the vertical high of location b at the rear of the frame R. The linkage bar(s) B(i) is (are) configured to be rigidly joined to the front end of the lower bar B(iii) and to the front end of the upper bar B(ii). In this manner the angle between each lower bar B(iii) and the corresponding upper bar B(ii) remains constant even as the coupler link B rotates relative to the axle a.

In some embodiments of the present invention, the upper bars B(ii) are rigidly joined to each other via a first crossbar K at the forward ends of the upper bars B(ii). In some embodiments of the present invention, the lower bars B(iii) are rigidly joined to each other via a second crossbar L at the forward ends of the lower bars B(iii). If two linkage bars B(i) are present, the linkage bars B(i) are rigidly joined to each other via a third crossbar J at the top ends of the linkage bars B(i).

Figure 5:
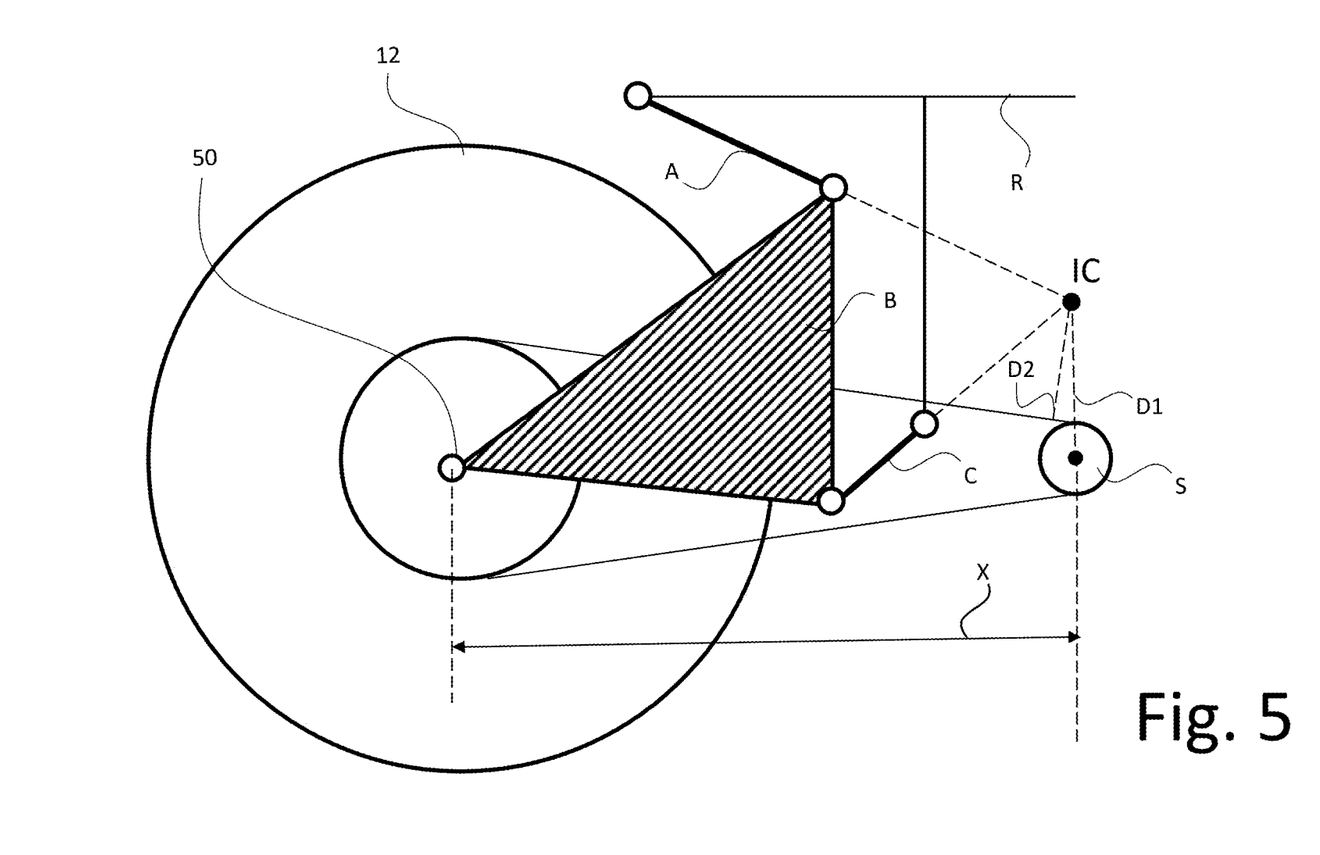
FIG. 5 is a detail of linkage suspension system, illustrating the position of the instantaneous center with respect to the sprocket, according to some embodiments of the present invention.
Figure 6:
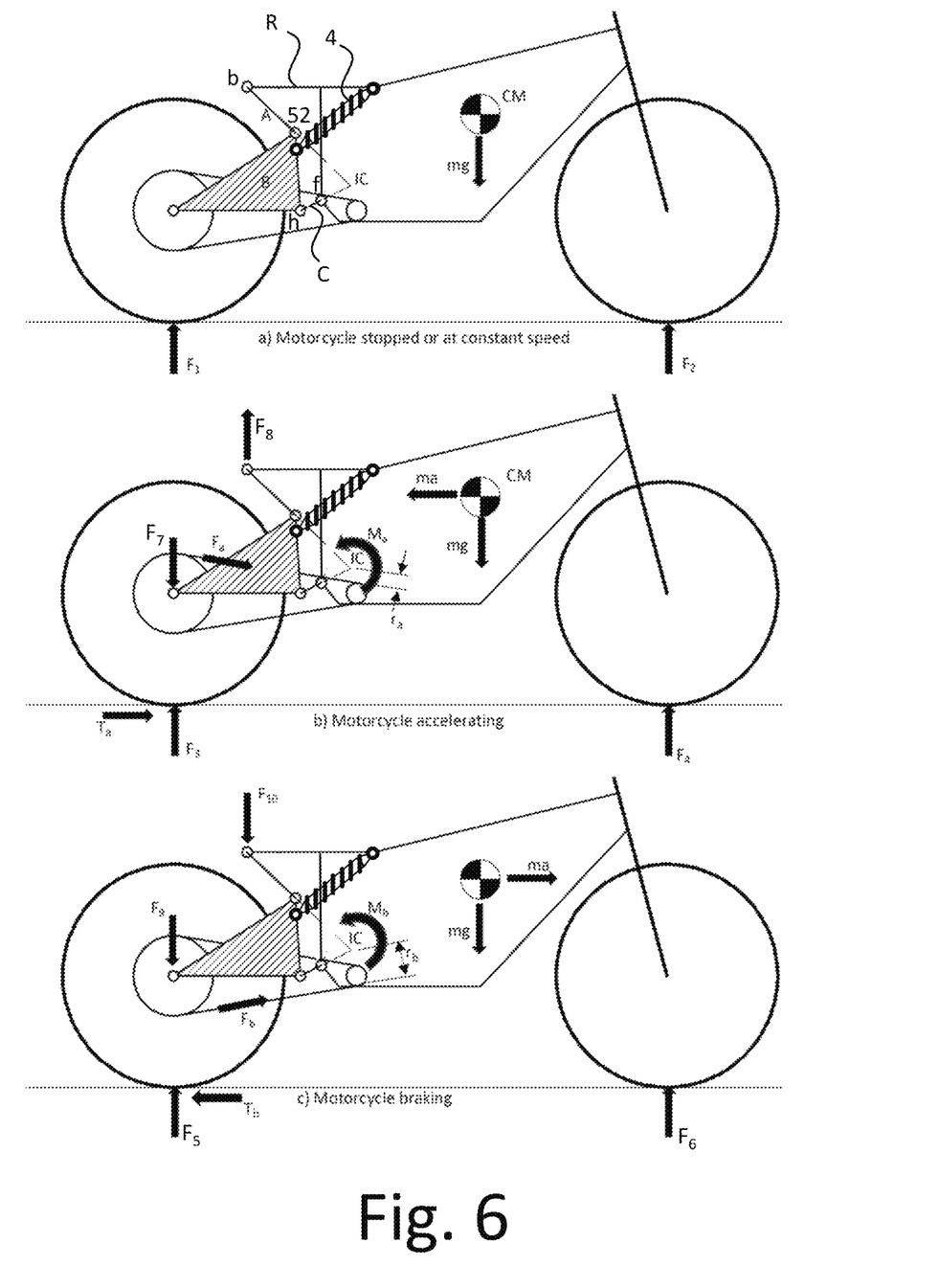
FIGS. 6a-6c illustrate the reaction of a chain-wheeled vehicle having a linkage suspension system of the present invention to constant speed, acceleration, and deceleration.

As seen in FIGS. 5 and 6a, the rear wheel linkage suspension system of the present invention is set such that the instantaneous center IC is above a portion of the chain proximal to the sprocket. In some embodiments of the present invention, the a distance D2 between the instantaneous center and the chain (D2 being perpendicular to the chain) is above and substantially vertically aligned with the center of the sprocket S (as shown by the virtual line D1), when the vehicle is at constant speed or idle. In some embodiments of the present invention, when the motorcycle is at rest with its weight suspended, the distance D1 between the instantaneous center IC and the center of the motor sprocket S is 1.30 or more times the pitch diameter of the sprocket. In some embodiments of the present invention, the distance X between the rear axle 50 and the center of the motor sprocket S does not vary by more than 0.1% for the full range of rear wheel travel. For most motorcycles, 0.1% of the distance X corresponds to about 3 mm. The pitch diameter of the sprocket is the diameter of an imaginary circle centered as the center of the sprocket S and traced by the center of the chain pins of the sprocket. In FIG. 6a, $F_1$ is the normal force applied on the rear wheel, $F_2$ is the normal force applied on the front wheel, mg is the weight of the vehicle, and CM is the center of mass of the vehicle.

Also, note the location h is lower than location f when the vehicle does not move. This is to ensure that the instantaneous center IC is above the portion of the chain which is vertically aligned with the instantaneous center IC.

In FIG. 6b, the vehicle accelerates and a forward-directed traction force $T_a$ acts on the rear wheel 12. The d'Alembert force ma is felt by the center of mass CM of the vehicle in reaction to traction force $T_a$. The chain tension $F_a$ acts on $r_a$ (which is the distance from instantaneous center IC to the top of the chain) to create a counterclockwise moment $M_a$ on the coupler link rear wheel linkage suspension system. A downward force $F_7$ is applied by the coupler link B on the rear wheel 12, due to the moment $M_a$. $F_8$ is vertical (upward) component of a force transmitted from the coupler link B to the frame through the upper links A in reaction to $F_7$. Therefore, the force $F_8$ counters the counterclockwise rotation of the frame R due to the squat effect. $F_8$ may be larger than $F_1$ (of FIG. 5a). During acceleration, the motor develops more torque and delivers more chain tension, thereby increasing $F_7$. $F_7$ is important because it adds traction to the vehicle. $F_8$ is the vertical component of the tension load in upper link A and is rotationally balanced with the d'Alembert via the rear shock absorber 4. $F_8$ is a function of engine power and locations and motions of the links A, B, and C relative to each other, and is an internal force in the vehicle.

The inventor tested a motorcycle having the rear wheel linkage suspension system of the present invention on a dyno. Straps were placed at the rear of the motorcycle to hold the rear wheel in contact with the dyno drum. The tension in the straps was measured at about 150 kg. In these tests, as the engine was powered up (as it would when accelerating on the road), the engine's torque and chain tension and the constraints in the motion of links A, B, and C forced the rear wheel downward to compress against the Dyno drum, causing the rear of the chassis to move upward. At the same time the front shock absorber compressed. Therefore, the rear wheel linkage suspension system of the present invention was shown to have an anti-squat effect that would counter the squat effect created by the motorcycle's acceleration. The anti-squat effect operates when the motorcycle's engine is powered up by (a) elevating the rear of the motorcycle frame (to counter the lowering in the rear of the motorcycle's frame during a squat) and (b) increasing the traction of the motorcycle's front wheel with the ground (to counter the decrease in traction of the front wheel during a squat).

In FIG. 6c, the vehicle decelerates and a rearward-directed traction force $T_b$ acts on the rear wheel 12. The chain tension $F_b$ acts on $r_b$ (which is the distance from the instantaneous center IC to bottom of the chain) to create a counterclockwise moment $M_b$ on the coupler link B. A downward force $F_9$ is applied by the coupler link B on the rear wheel 12, due to the moment $M_b$ and to the constraints of the motion of links A, B and C. $F_{10}$ is vertical (downward) component of a force transmitted from the coupler link B to the frame through the upper links A in reaction to $F_9$.

Because the force $F_{10}$ on the rear section of the frame R is directed downwards, the force $F_{10}$ counters the upward motion of the frame above the rear wheel that is generated during dive.

The inventor tested a motorcycle having the rear wheel linkage suspension system of the present invention on a dyno. Straps were placed at the rear of the motorcycle to hold the rear wheel in contact with the dyno drum. The tension in the straps was measured at about 150 kg. In these tests, as the engine was powered down (as it would when decelerating on the road), the change in the engine's torque and chain tension and the constraints in the motion of links A, B, and C, forced the rear wheel downward to compress against the Dyno drum, causing the rear shock absorber to compress (move downward) and the front shock absorber to expand (move upward). This causes the upper link A to rotate counterclockwise with respect to the location 52, causing a downward force $F_{10}$ in the rear of the frame R.

Therefore, the rear wheel linkage suspension system of the present invention was shown to have an anti-dive effect that would counter the dive effect created by the motorcycle's deceleration. The anti-dive effect operates when the motorcycle's engine is powered down by (a) lowering the rear of the motorcycle frame (to counter the raise in the rear of the motorcycle's frame during a dive) and (b) shifting the motorcycle's weight rearward thereby decreasing the traction of the motorcycle's front wheel with the ground while increasing the traction of the motorcycle's rear wheel with the ground (to counter the decrease in traction on the rear wheel during a dive).

It should be noted that while this document shows examples of two-wheeled vehicles, the rear wheel linkage suspension system of the present invention can be applied to any vehicle, with any number of wheels, as long as the vehicle is chain driven.

Figure 7A:
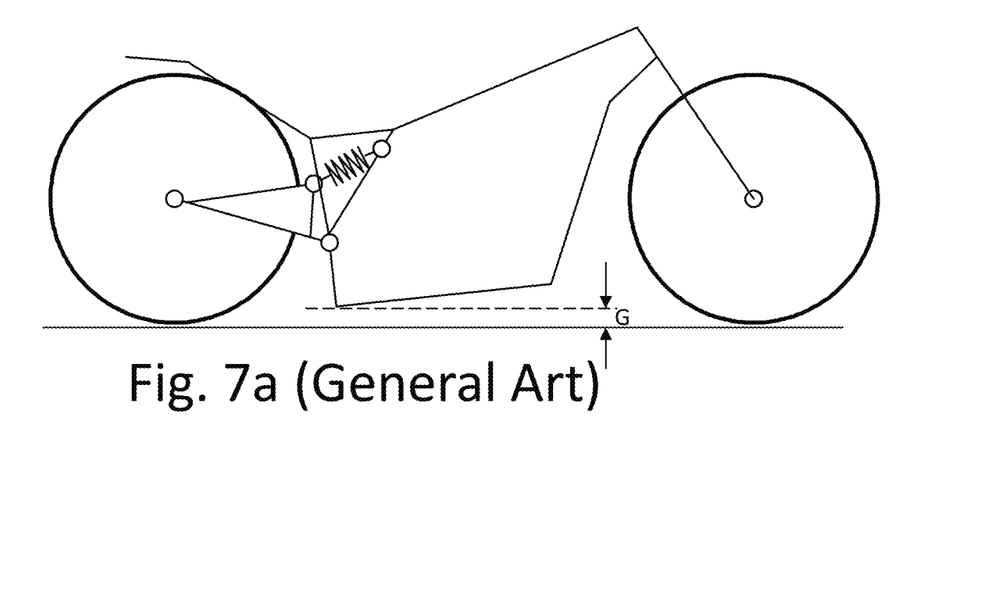
FIG. 7a illustrates the rotation of the frame of a chain-wheeled vehicle with a swing arm attachment known in the general art, as a reaction to cornering.

FIG. 7a shows that during cornering of a motorcycle having a swing arm and moving from left to right, the rear shock absorber 4 compresses, rotating the frame counterclockwise (squat). Thus, such a motorcycle is unstable because the hinging action at the swing arm pivot allows the swing arm to move independently of the frame.

Figure 7B:
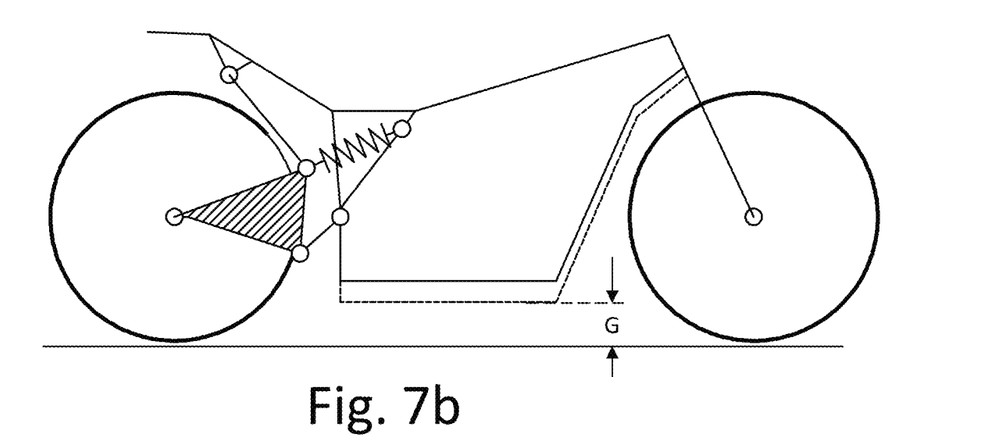
FIG. 7b illustrates the primarily vertical motion of the frame of a chain-wheeled vehicle having a linkage suspension system of the present invention, as a reaction to cornering.

FIG. 7b shows a motorcycle having a rear wheel linkage system of the present invention, as described above. In this illustration suspension movements that result from centrifugal force from the cornering are shown. Because of the properties of the four-bar linkage (upper, lower, and coupler links and the frame), the relative movement (coupler link with respect to the frame) is coordinated such that when either frame or coupler link moves as a result of an external force, the other moves on a constrained path.

The linkage system of the present invention provides coordinated motion for the frame, such that the frame's movement is primarily vertical. The solid lined frame is the frame at rest or constant speed, while the dashed lines show the frame during acceleration and deceleration.

Therefore, in a conventional motorcycle, the rotation of the frame substantially decreases the distance G between the lowest point of the frame and the ground (i.e., ground clearance) during acceleration and deceleration. In contrast, the mostly vertical motion of the frame in a motorcycle having the linkage system of the present invention reduces the decrease in G. Therefore, for a given ground clearance at rest, the effective ground clearance available during cornering is greater in a motorcycle having the linkage system of the present invention. This is especially important when the motorcycle when the motorcycle is tilted to one side during cornering, further decreasing the ground clearance.

Figure 8A:
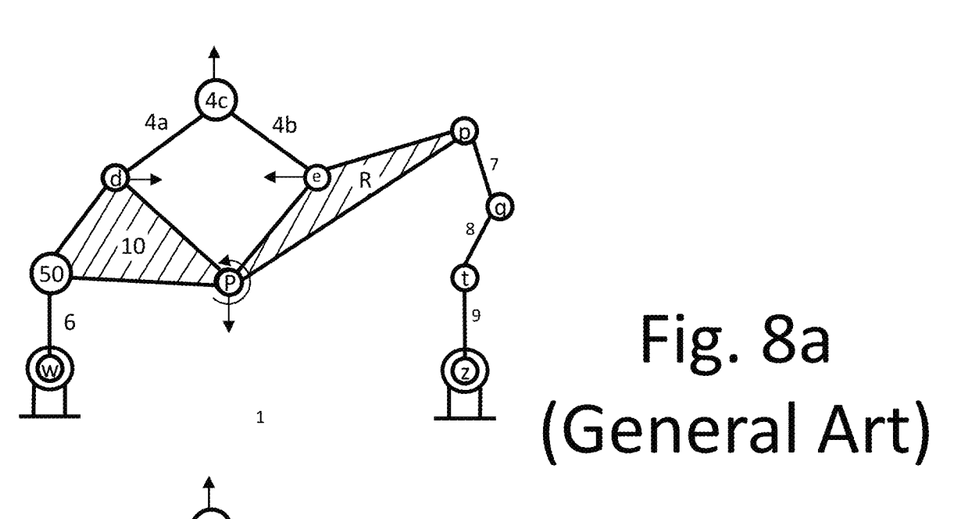
FIG. 8a illustrates the effect on the frame of compression of the rear shock absorber on the hinge between the swing arm in a chain-wheeled vehicle with a swing arm attachment known in the general art.
Figure 8B:
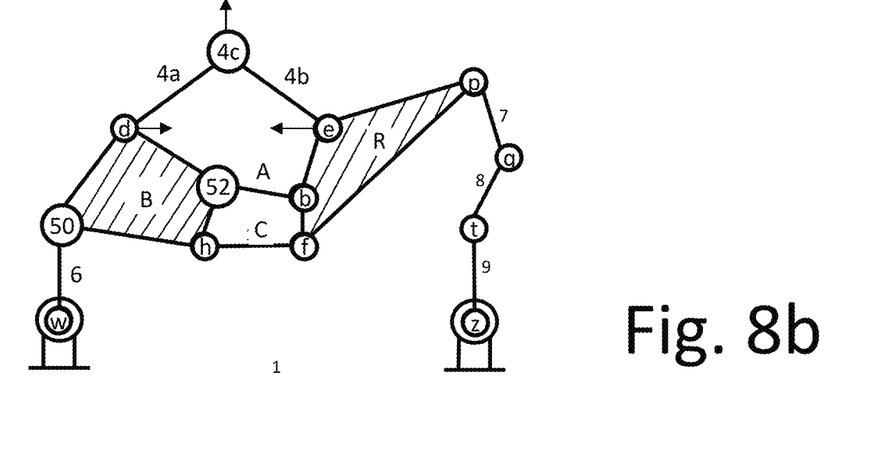
FIG. 8b illustrates the decreased effect on the frame of compression of the rear shock absorber a linkage suspension system of the present invention.

FIG. 8a illustrates a swing arm attachment known in the art causes rotation of the frame when the rear shock absorber is compressed during cornering. FIG. 8b illustrates that the linkage system of the present invention decreases the squat of the frame when the rear shock absorber is compressed during cornering.

FIGS. 8a and 8b are representations that are equivalent to the representations of the above figures, and more clearly show the forces acting on different elements of the vehicle.

For these representations:
Pivots 50 and t are the front and rear wheel axles;
Pivots w and z are at infinity, representing the normal forces from the ground, giving pivots 50 and t straight line motion;
Link 10 is the swing arm coupler link as known in the art;
Link B is the coupler link of the present invention, as described above;

The shock absorber is represented by arms 4a and 4b, that are hingedly connected to each other at hinge 4c. The rear shock absorber is compressed during cornering, the connections d and e move closed to each other, moving the hinge 4c upward;

Links 7 and 8 and the hinge q represent the front shock absorber.

Links A and C represent the lower and upper links of the present invention, as described above, respectively.

Link R represents the frame. The frame R is connected to the rear shock absorber at hinge e and to the front shock absorber at hinge p. In FIG. 7a, the frame R is connected to the swing arm coupler link 10 at a single pivot P, as known in the art. In FIG. 7b. the frame R is hingedly connected to the links A and C are respective locations b and f. The links A and C are hingedly connected to the coupler link B at locations 52 and h, as explained above.

In FIG. 8a, during cornering, when the rear shock absorber is compressed, there is a hinging action at pivot P. In contrast, in FIG. 8b, in the present invention, there is coordinated relative movement between the coupler link B and the frame R such that with the parameters described above, the effective ground clearance decreases less than it would with a swing arm link known in the art. Remembering that in effect, the location b is behind the location d, the compression of the rear shock absorber during cornering causes the frame R to translate vertically and rotate less, as shown in FIG. 7b above. The schematic representation of FIG. 8b shows the constrained motion relationship between the coupler link B and the frame R via links A and C, and thusly being a design parameter contained within the description above.

Although the invention is described above in terms of various exemplary embodiments and implementations, it should be understood that the various features, aspects, time measurements, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A rear wheel linkage system for connecting a rear wheel of a chain wheeled vehicle to a frame of the chained wheel vehicle, the rear wheel linkage system comprising:
    a pair of upper links configured to be placed on either side of a rear wheel of a vehicle and symmetrical to each other with respect to a central vertical plane splitting the vehicle into two lateral halves, the upper links having first upper ends and first lower ends, the first upper ends being configured to be hingedly joined to first locations of a frame of the vehicle, at a rear of the frame above or near a top of the rear wheel;
    a pair of lower links configured to be placed on either side of the rear wheel and symmetrical to each other with respect to the central vertical plane, the lower links having second upper ends and second lower ends, the second upper ends being configured to be hingedly joined to second locations of the frame, ahead of the rear wheel;
    a coupler link configured to be hingedly joined to both sides of an axle of the rear wheel, the coupler link having:
        an upper side extending diagonally forward and upward from the axle when joined to the axle and having a first rear edge at the axle and a first front edge clearing the wheel;
        a lower side extending below the upper side from the axle when joined to the axle, toward a front of the vehicle, and having a second rear edge at the axle and a second front edge clearing the wheel;
        a front side extending between the first front edge and the second front edge, to maintain an angle between the upper side and the lower side constant;
    wherein:
        the first front edge of the upper side of the coupler link is hingedly joined to the first lower ends of the upper links;
        the second front edge of the lower side of the coupler link is hingedly joined to the second lower ends of the lower link;
        the front side of the coupler link is configured to be hingedly joined to a third rear edge of a rear shock absorber which has a third front edge hingedly joined to the frame ahead of the third rear edge;
        each upper link extends diagonally forward and downward from the first upper end to the first lower end, and each lower link extends forward an upward from the second lower end the second upper end;
        an instantaneous center is a point at which extensions of the upper links and of the lower links have a common vertical height;
    such that when the vehicle is at constant speed or idle and when the rear wheel linkage system connects the rear wheel of the vehicle to the frame of the vehicle, the instantaneous center is located above a portion of a chain of the vehicle proximal to a sprocket of the vehicle and above a center of the sprocket of the vehicle.

2. The rear wheel linkage system of claim 1, wherein, when the vehicle is at constant speed or idle and when the rear wheel linkage system connects the rear wheel of the vehicle to the frame of the vehicle, a perpendicular distance between the instantaneous center and the chain of the vehicle is above and substantially vertically aligned with the center of the sprocket.

3. The rear wheel linkage system of claim 1, wherein:
    the upper side of the coupler link comprises a pair of upper bars configured to be located symmetrically to each other with respect to the central vertical plane, each upper bar having a first rear end configured to be connected to the axle and a first front end located below the first locations of the frame;
    the lower side of the coupler link comprises a pair of lower bars configured to be located symmetrically to each other with respect to the central vertical plane, each lower bar having a second rear end configured to be connected to the axle and a second front end located below the second locations of the frame;
    the front side of the coupler link comprises a linkage bar rigidly joined to the first front ends and the second front ends.

4. The rear wheel linkage system of claim 1, wherein:
    when the vehicle is at rest with a weight of the vehicle is suspended and when the rear wheel linkage system connects the rear wheel of the vehicle to the frame of the vehicle, a distance between the instantaneous center and a center of the sprocket of the vehicle is at least 1.30 times larger than a pitch diameter of the sprocket.

5. The rear wheel linkage of claim 1, wherein:
given a predetermined distance between the axle of the rear wheel and a center of a sprocket of the vehicle, when the vehicle is at rest with a weight of the vehicle is suspended and when the rear wheel linkage system connects the rear wheel of the vehicle to the frame of the vehicle, a configuration of the coupler link, lower links, and upper links in the vehicle allows of variation of the predetermined distance that is equal to or smaller than 0.1%.

6. A rear wheel linkage system for connecting a rear wheel of a chain wheeled vehicle to a frame of the chain wheeled vehicle, the rear wheel linkage system comprising:
a pair of upper links on either side of the rear wheel and symmetrical to each other with respect to a central vertical plane splitting the vehicle into two lateral halves, the upper links having first upper ends and first lower ends, the first upper ends being configured to be hingedly joined to first locations of the frame, at a rear of the frame above or near a top of the rear wheel;
a pair of lower links on either side of the rear wheel and symmetrical to each other with respect to the central vertical plane, the lower links having second upper ends and second lower ends, the second upper ends being configured to be hingedly joined to second locations of the frame, ahead of the rear wheel;
a coupler link configured to be hingedly joined to both sides of an axle of the rear wheel, the coupler link having:
an upper side extending diagonally forward and upward from the axle and having a first rear edge at the axle and a first front edge clearing the wheel;
a lower side extending below the upper side from the axle toward a front of the vehicle and having a second rear edge at the axle and a second front edge clearing the wheel;
a front side extending between the first front edge and the second front edge, to maintain an angle between the upper side and the lower side constant; and
a rear shock absorber which has a third front edge and a third rear edge, the third rear edge being configured to be hingedly joined to the frame ahead of the third rear edge;
wherein:
the first front edge of the upper side of the coupler link is hingedly joined to the first lower ends of the upper links;
the second front edge of the lower side of the coupler link is hingedly joined to the second lower ends of the lower link;
the front side of the coupler link is configured to be hingedly joined to the third rear edge of the rear shock absorber;
each upper link extends diagonally forward and downward from the first upper end to the first lower end, and each lower link extends forward an upward from the second lower end the second upper end;
an instantaneous center is a point at which extensions of the upper links and of the lower links have a common vertical height;
such that when the vehicle is at constant speed or idle and when the rear wheel linkage system connects the rear wheel of the vehicle to the frame of the, the instantaneous center is located above a portion of a chain of the vehicle proximal to a sprocket of the vehicle and above the a center of the sprocket of the vehicle.

7. A vehicle comprising:
a rear wheel;
a frame;
a rear wheel linkage system for connecting the rear wheel to the frame, the rear wheel linkage system comprising:
a pair of upper links on either side of the rear wheel and symmetrical to each other with respect to a central vertical plane splitting the vehicle into two lateral halves, the upper links having first upper ends and first lower ends, the first upper ends being hingedly joined to first locations of the frame, at a rear of the frame above or near a top of the rear wheel;
a pair of lower links on either side of the rear wheel and symmetrical to each other with respect to the central vertical plane, the lower links having second upper ends and second lower ends, the second upper ends being hingedly joined to second locations of the frame, ahead of the rear wheel;
a coupler link hingedly joined to both sides of an axle of the rear wheel, the coupler link having:
an upper side extending diagonally forward and upward from the axle and having a first rear edge at the axle and a first front edge clearing the wheel;
a lower side extending below the upper side from the axle toward a front of the vehicle and having a second rear edge at the axle and a second front edge clearing the wheel;
a front side extending between the first front edge and the second front edge, to maintain an angle between the upper side and the lower side constant;
a rear shock absorber which has a third front edge and a third rear edge, the third rear edge being hingedly joined to the frame ahead of the third rear edge;
wherein:
the first front edge of the upper side of the coupler link is hingedly joined to the first lower ends of the upper links;
the second front edge of the lower side of the coupler link is hingedly joined to the second lower ends of the lower link;
the front side of the coupler link is configured to be hingedly joined to the third rear edge of the rear shock absorber;
each upper link extends diagonally forward and downward from the first upper end to the first lower end, and each lower link extends forward an upward from the second lower end the second upper end;
an instantaneous center is a point at which extensions of the upper links and of the lower links have a common vertical height;
when the vehicle is at constant speed or idle, the instantaneous center is located above a portion of a chain of the vehicle proximal to a sprocket of the vehicle and above a center of the sprocket of the vehicle.

* * * * *